(12) United States Patent
Nakamura et al.

(10) Patent No.: US 6,389,152 B2
(45) Date of Patent: May 14, 2002

(54) METHOD AND APPARATUS FOR SUPERPOSING A DIGITAL WATERMARK AND METHOD AND APPARATUS FOR DETECTING A DIGITAL WATERMARK

(75) Inventors: Takeshi Nakamura; Kazumi Sugaya; Yoshiaki Moriyama, all of Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/829,206

(22) Filed: Apr. 9, 2001

Related U.S. Application Data (63) Continuation of application No. 09/152,293, filed on Sep. 14, 1998, now Pat. No. 6,246,775.

(30) Foreign Application Priority Data

Sep. 17, 1997 (JP) ............................................. 9-293123

(51) Int. Cl.[7] .................................................. G06K 9/00
(52) U.S. Cl. ....................................................... 382/100
(58) Field of Search ................................ 382/100, 232; 713/176, 179, 181; 370/527, 528, 529; 348/460, 461, 465; 725/25, 31

(56) References Cited

U.S. PATENT DOCUMENTS

| | | | |
|---|---|---|---|
| 5,497,241 A | 3/1996 | Ostrover et al. ............... | 386/97 |
| 5,530,759 A * | 6/1996 | Braudaway et al. ........... | 380/54 |
| 5,949,885 A | 9/1999 | Leighton ...................... | 380/54 |
| 6,031,914 A | 2/2000 | Tewfik et al. ................. | 380/54 |
| 6,061,793 A * | 5/2000 | Tewfik et al. ................. | 713/176 |
| 6,272,634 B1 * | 8/2001 | Tewfik et al. ................. | 713/176 |

FOREIGN PATENT DOCUMENTS

| | | | |
|---|---|---|---|
| EP | 0 891 071 A2 | 1/1999 | ............. H04N/1/32 |
| EP | 0 901 282 A2 | 3/1999 | .......... H04N/5/913 |

OTHER PUBLICATIONS

"Transparent Robust Image Watermarking" by Swanson et al., IEEE, 1996.*

Bors A G et al: "Image Watermarking Using DCT Domain Constraints" Proceedings of the International Conference on Image Processing (ICIP), US, New York, IEEE, Sep. 1996 (1996–09), pp. 231–234, XP000668944 ISBN: 0–7803–3259–8.

Hartung and Girod: "Digital Watermarking of Raw and Compressed Video" Proceedings of the SPIE, US, SPIE, Bellingham, Va, vol. 2952, Oct. 7, 1996, pp. 205–213, XP002085796.

* cited by examiner

Primary Examiner—Andrew W. Johns
Assistant Examiner—Shervin Nakhjavan
(74) Attorney, Agent, or Firm—Sughrue Mion, PLLC (57) ABSTRACT

An apparatus for superposing a digital watermark for superposing digital watermark information on an information data signal bearing original information superposes digital watermark information on an information data signal bearing original information, for each unit block consisting of a group of pieces of information data. This apparatus is provided with an auxiliary embedding circuit 10 of or embedding second digital watermark information in the information data; a blocking circuit 12 for dividing into the unit blocks the changed information data signal obtained by the auxiliary embedding circuit; and a main embedding circuit 20 for embedding first digital watermark information in the changed information data signal for each of the divided blocks. The second digital watermark information bears information for identifying the position of the divided unit block in a predetermined section of the information data signal. On the basis of the second watermark information, a detecting apparatus effects proper blocking with respect to the information data signal with the watermark embedded therein, so as to detect the first watermark information.

24 Claims, 9 Drawing Sheets

FIG. 2A WIDE TV

FIG. 2B PAN SCAN

FIG. 2C LETTER BOX

METHOD AND APPARATUS FOR SUPERPOSING A DIGITAL WATERMARK AND METHOD AND APPARATUS FOR DETECTING A DIGITAL WATERMARK

This is a Continuation of application Ser. No. 09/152,293 filed Sep. 14, 1998, now U.S. Pat. No. 6,246,775 the disclosure of which is incorporated herein by reference.

BACKGROUND OF THE INVENTION

1. Field of the Invention

The present invention relates to a technology in which digital watermark information (hereafter referred to as the watermark) is superposed on, or embedded in hidden form in, data on image or sound data, and more particularly to a method for embedding a watermark on an information data signal in block units each consisting of a group of a small number of pieces of information data, a method of detecting the watermark from the information data signal with the watermark embedded therein, and a method in accordance with these methods.

2. Description of the Related Art

Currently, as optical recording media on which information data can be written, DVD-Rs and DVD-RAMs are being put to practical use, but in putting the DVD-Rs and DVD-RAMs to practical use, it is necessary to devise measures for preventing illegal copying of video and audio software and the like. Accordingly, attention is being focused on a digital watermark technology in which copyright information or information indicating a copy guard is expressed by a watermark which is a visually or audibly inconspicuous image pattern, and this watermark is superposed on the image data or the sound data.

The basic system of such a digital watermark technology is broadly classified into type types. One is a type in which sampled values of waveform and pixels are provided with processing, and the watermark is embedded therein. For instance, a technique in which the watermark is added to luminance values of the image corresponds to this type. As another type, there is a system in which the image data and the sound data are converted to frequency components, and the watermark is embedded in particular frequency components. The fast Fourier transform (FFT), the discrete cosine transform (DCT), and the like are used in such frequency conversion.

Figure 1:
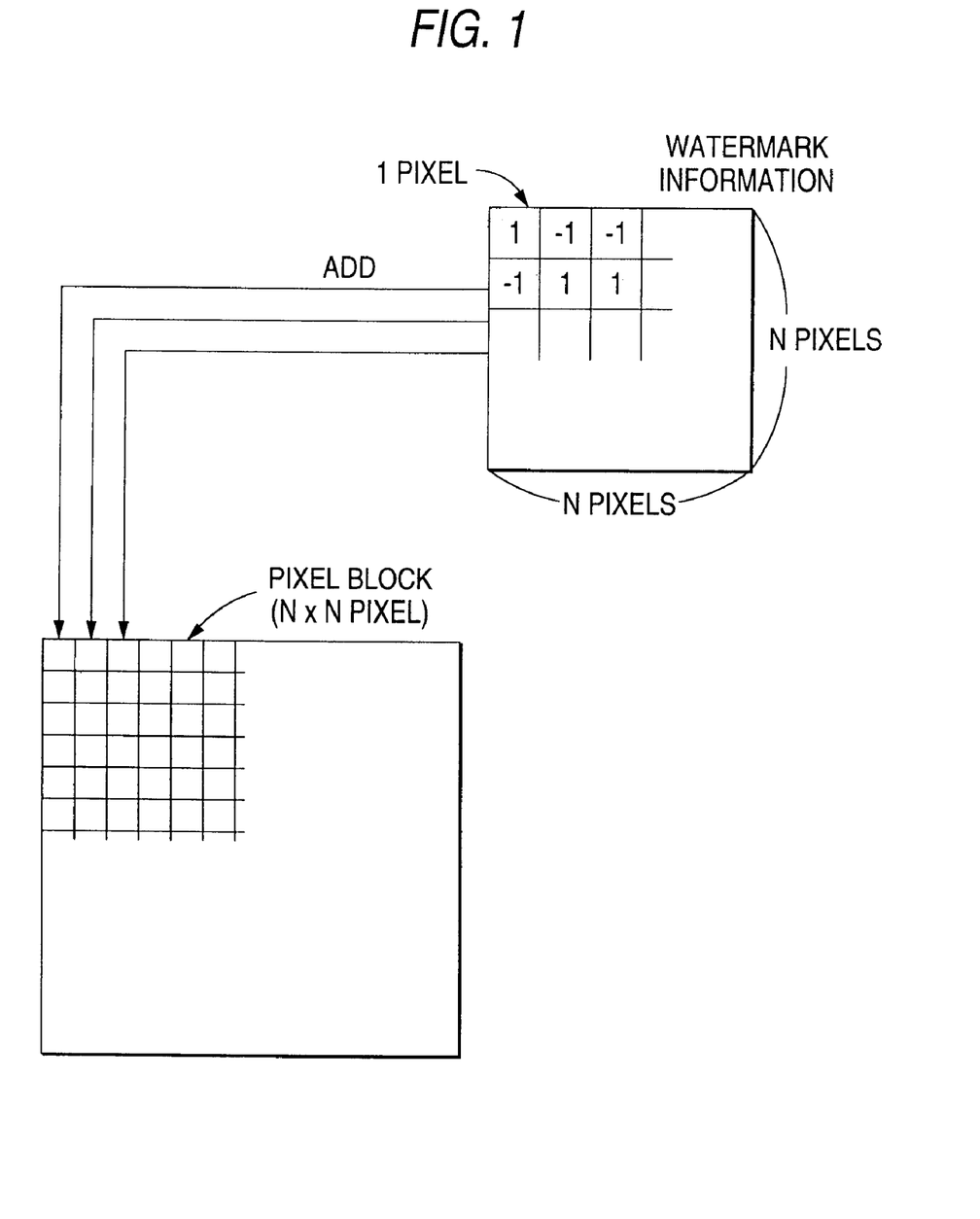
FIG. 1 is a schematic diagram illustrating a form in which digital watermark information is embedded in image data by a block division method.

On the other hand, a technique is also known in which data is divided into a plurality of small pixel blocks, and watermark information is embedded (hereafter referred to as the block division method) (see FIG. 1). In this technique, image data is divided into a plurality of small unit pixel blocks each having a size of N×N pixels, and a watermark having the same block size of this unit pixel block is added to the pixel block. According to this technique, even if a portion of image data of one frame is extracted, the watermark is left insofar as its size is not smaller than that of the unit pixel block. On the reproduction side, the embedded data is divided into similar unit pixel blocks, and the watermark is detected for each unit pixel block and is decrypted.

Here, a form is considered in which, for example, image data in which a watermark is embedded is recorded on a disk such as a DVD, and the image data is read from the disk and is reproduced.

There are cases where a disk player for reading such a disk is required to output a first image signal having an aspect ratio of 16:9 for displaying an image on a so-called wide-screen television, as well as a second image signal having an aspect ratio of 4:3 for displaying an image on ann ordinary television. If it is assumed that image data for forming a squeezed-type original image with 480 [dots] high and 720 [dots] wide has been recorded on the DVD, the disk player must perform aspect ratio conversion with respect to the image data obtained from the DVD in order to generate the first image signal. The same also applies to the second image signal, and the disk player must perform the aspect ratio conversion with respect to the image data obtained from the DVD in order to generate the second image signal.

Figure 2A:
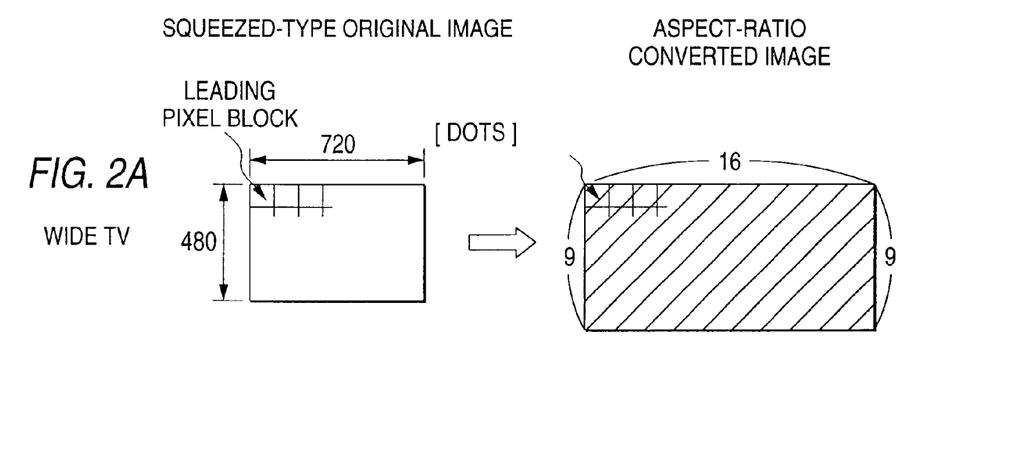
FIGS. 2A to 2C are schematic diagrams illustrating various forms of aspect ratio conversion from a squeezed-type image recorded on a DVD.

The aspect ratio conversion into the first image signal can be basically accomplished by effecting interpolation of pixels in the horizontal direction of the screen, as shown in FIG. 2A. Two forms such as those shown in FIGS. 2B and 2C are conceivable as the aspect ratio conversion into the second image signal.

Figure 2B:
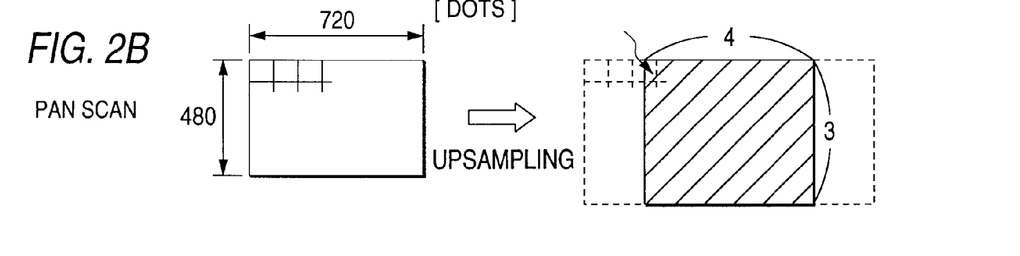
Figure 2C:
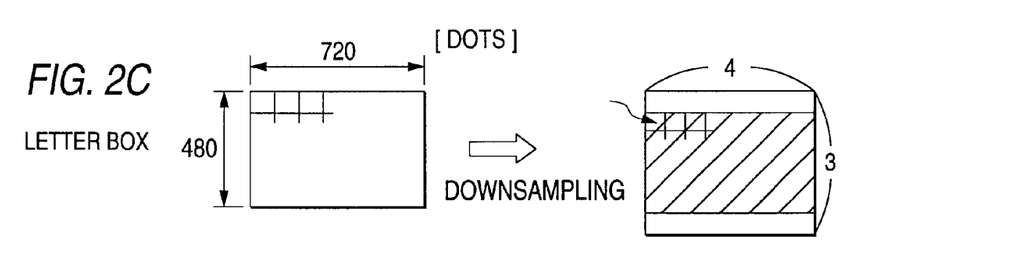

As shown in FIG. 2B, the squeezed-type original image with 480 [dots] high and 720 [dots] wide recorded on the DVD is converted into image data by being upsampled in such a manner that the aspect ratio becomes 4:3. This is a converted image which is a so-called pan scan, and assumes a form in which left- and right-hand side end portions of the image based on the image data obtained from the DVD are cut off so that the image assumes the aspect ratio of 4:3. Meanwhile, as shown in FIG. 2C, the original image recorded on the DVD is converted into image data by being downsampled in such a manner that the aspect ratio becomes 4:3. This is a converted image which is a so-called letter box, and assumes a form in which predetermined images (e.g., strip-like images of a black color) are pasted on upper and lower end portions of the image based on the image data obtained from the DVD so that the image assumes the aspect ratio of 4:3.

In the same way as the first image signal, the second image signal converted into such a pan scan or letter box image can be recorded on a recording medium such as the aforementioned DVD-R or DVD-RAM by the DVD recorder, for example. At this time, however, in the DVD recorder, the watermark embedded in the second image signal to prevent an act of infringement of the copyright is detected and decrypted. If it is detected that the relevant watermark bears, for instance, information indicating prohibition of copying, the DVD recorder prohibits its own recording operation, and does not record the second image signal even if a recordable DVD is supplied thereto. On the other hand, only when it is detected that the relevant watermark bears information indicating that copying is allowed, the DVD recorder is able to record the second image signal on the DVD supplied thereto.

In the case of FIG. 2A, since the DVD player effects conversion into the information of the 16:9 image by using all the information of the squeezed-type original image and by expanding the information, in the block division method, the upper leftmost unit pixel block in the original image, for example, is positioned in the converted 16:9 image at the same upper leftmost position by changing its size. Therefore, the DVD recorder is capable of properly detecting and decrypting the watermark consecutively starting with, for example, this upper leftmost unit pixel block of the 16:9 image data supplied thereto.

However, as can be seen from what is shown in FIGS. 2B and 2C, in the case of the images such as the pan scan and the letter box, their pixel positions and sizes have changed from those of the original images, so that the recognition of the unit pixel blocks in the DVD recorder needs to be made different from that in the case of FIG. 2A.

To give a more detailed description, in the case of FIG. 2B, since the DVD player effects conversion into the information of the 4:3 image by eliminating the information of left- and right-hand side portions of the squeezed-type original image and by expanding the remaining information, in the block division method, the upper leftmost unit pixel block in the original image is already missing in the converted 4:3 image. Further, even if, for example, the third unit pixel block from left in the uppermost row is present in the converted 4:3 image, there is a high possibility that the 4:3 image starts midway in the relevant block, as illustrated in the drawing.

In such a case, if the DVD recorder starts detection of the watermark without recognizing that, for example, the third unit pixel block from the left in the 4:3 image data supplied thereto is fragmentary, the DVD recorder fails to properly detect not only that third unit pixel block but also ensuing unit pixel blocks.

In addition, in the case of FIG. 2C, since the DVD player effects conversion into the information of the 4:3 image by synthesizing predetermined images on upper and lower sides of the squeezed-type original image by expanding the synthesized image information, in the block division method, the leading upper leftmost unit pixel block in the original image does not correspond to the upper leftmost portion of the converted 4:3 image, and is positioned by being moved to the leftmost position in the row immediately below the upper predetermined image used in the synthesis.

In such a case, if the DVD recorder starts detection of the watermark without recognizing that the relevant leading unit pixel block of the supplied 4:3 image data has shifted from the leftmost position to the moved position in the image (frame image), the DVD recorder naturally cannot detect the watermark from the predetermined image where the watermark is not embedded, and this state will continue for a long period. Depending on the watermark detection process, if the watermark-undetected state continues for a long period of time, a error may be outputted, or the image may be handled as one in which the watermark is not present in this image.

SUMMARY OF THE INVENTION

The present invention has been devised in view of the above-described problems, and an object of the invention is to provide a method and apparatus for superposing a digital watermark on image data and a method and apparatus for detecting a digital watermark which make it possible to properly recognize a unit pixel block in the block division method and reliably detect watermark information.

Another object of the present invention is to provide a method and apparatus for superposing a digital watermark on image data and a method and apparatus for detecting a digital watermark which make it possible to properly recognize a unit pixel block and reliably detect watermark information even after image data is subjected to aspect ratio conversion.

In accordance with the present invention, there is provided a method for superposing a digital watermark for superposing digital watermark information on an information data signal bearing original information, for each unit block consisting of a group of a small number of pieces of information data, comprising the steps of: embedding second digital watermark information in the information data; dividing the changed information data signal thereby obtained into the unit blocks; and embedding first digital watermark information in the changed information data signal for each of the divided blocks, wherein the second digital watermark information bears information for identifying a position of the divided unit block in a predetermined section of the information data signal.

In such a method, the information data signal may be a video signal.

In accordance with the present invention, there is provided an apparatus for superposing a digital watermark for superposing digital watermark information on an information data signal bearing original information, for each unit block consisting of a group of a small number of pieces of information data, comprising: auxiliary embedding means for embedding second digital watermark information in the information data; blocking means for dividing into the unit blocks the changed information data signal obtained by the auxiliary embedding means; and main embedding means for embedding first digital watermark information in the changed information data signal for each of the divided blocks, wherein the second digital watermark information bears information for identifying a position of the divided unit block in a predetermined section of the information data signal.

In such an apparatus, the information data signal may be a video signal.

In addition, the second watermark information may be information of a random pattern generated on the basis of an M-sequence.

In accordance with the present invention, there is provided a method for detecting a digital watermark for detecting digital watermark information from a changed information data signal generated by superposing the digital watermark information on an information data signal, for each unit block consisting of a group of a small number of pieces of information data, comprising the steps of: detecting second digital watermark information from the changed information data signal, and recognizing a position of a divided unit block in a predetermined section of the information data signal; dividing the changed information data signal on the basis of the recognized position into the unit blocks; and detecting first digital watermark information for each of the divided unit blocks from the changed information data signal.

In such a method, the information data signal may be a video signal.

In accordance with the present invention, there is provided an apparatus for detecting a digital watermark for detecting digital watermark information from a changed information data signal generated by superposing the digital watermark information on an information data signal, for each unit block consisting of a group of a small number of pieces of information data, comprising the steps of: position-identifying-information detecting means for detecting second digital watermark information from the changed information data signal, and recognizing a position of a divided unit block in a predetermined section of the information data signal; blocking means for dividing the changed information data signal on the basis of the recognized position into the unit blocks; and information detecting means for detecting from the changed information data signal first digital watermark information for each of the unit blocks divided by the blocking means.

In such an apparatus, the information data signal may be a video signal.

Further, the video signal may bear an image of a letter box type or an image of a pan scan type.

Furthermore, in each form of the apparatus for detecting a digital watermark, the position-identifying-information detecting means may detect the second digital watermark information from the changed information data signal on the basis of information of a random pattern generated in accordance with an M-sequence.

DETAILED DESCRIPTION OF THE PREFERRED EMBODIMENTS

Referring now to the drawings, a detailed description will be given of the embodiments of the present invention.

Figure 3:
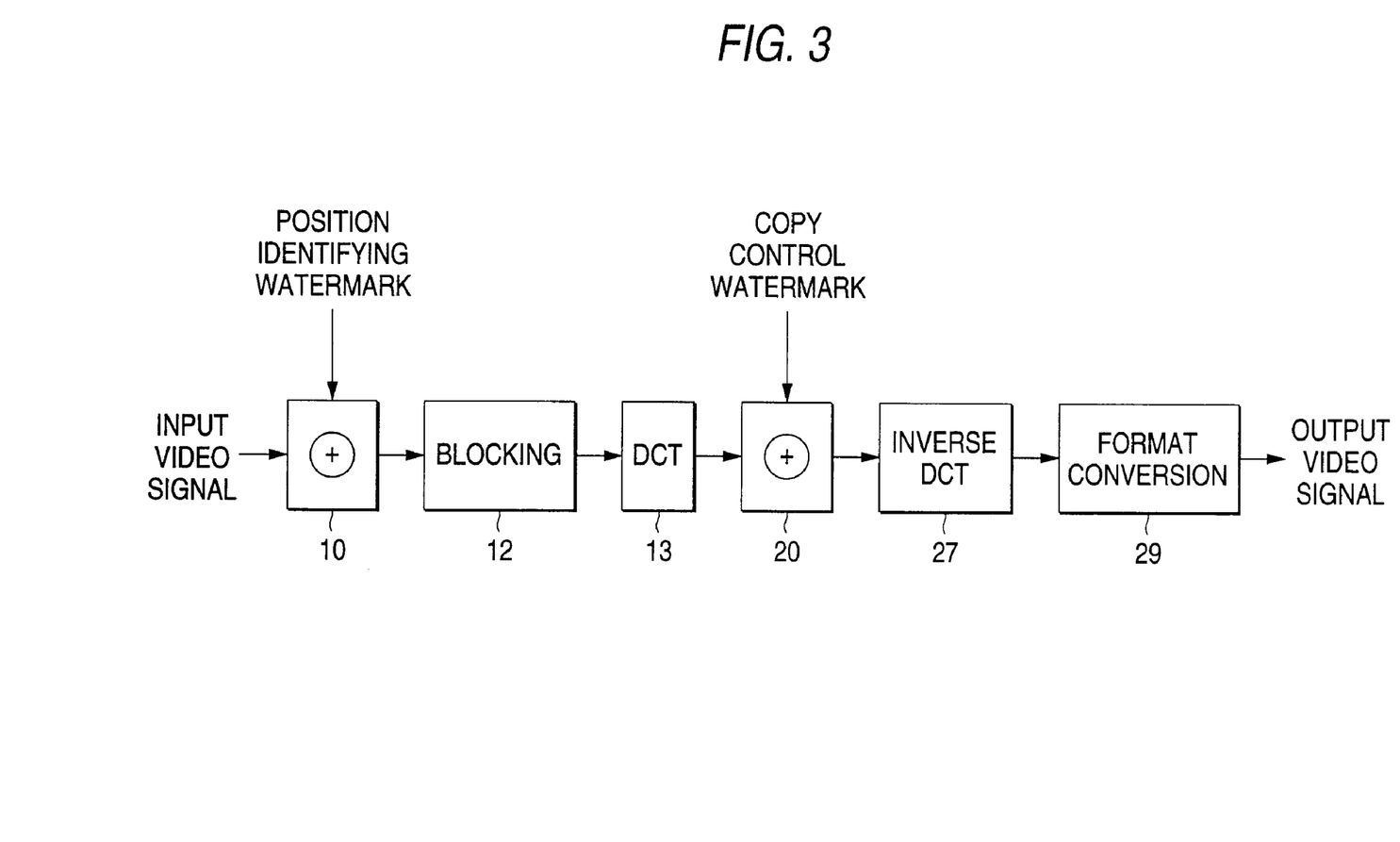
FIG. 3 is a block diagram illustrating a schematic configuration of a watermark superposing apparatus in accordance with an embodiment of the present invention.

FIG. 3 shows a schematic configuration of a watermark superposing apparatus for generating a watermark in accordance with a water mark superposing method based on the present invention and for superposing the watermark on an input video signal.

In FIG. 3, the input vide signal which is a digital signal of a sequence of sampled values is supplied to an auxiliary-watermark-information embedding circuit 10 where an auxiliary (second) watermark is embedded in the overall frame image so as to be provided in hidden form. This auxiliary embedding circuit 10 can be realized by a configuration including a level adder. This embedded video signal is supplied to a blocking circuit 12.

The blocking circuit 12 divides the supplied video signal into groups of a small number of pieces of information data, e.g., pixel blocks each consisting of data of 8 pixels wide×8 pixels high in a frame image, and supplies them to a discrete cosine transform (DCT) circuit 13. The DCT circuit 13 performs two-dimensional DCT operations with respect to such pixel data blocks each consisting of 8×8 pixel data so as to obtain DCT coefficients DC1 to DC64 corresponding to 64-system frequency components, and supplies these DCT coefficients DC1 to DC64 to a main-watermark-information embedding circuit 20. This main-watermark-information embedding circuit 20 can be realized by a coefficient adder.

Values which bear a copy control watermark, i.e., a main first watermark different from a position identifying (positioning) watermark, i.e., the aforementioned second watermark, is also supplied to the embedding circuit 20. The copy control watermark indicates whether or not, after an output video signal from this apparatus has been recorded on a disk, the video signal obtained by reading that disk can be copied, i.e., recorded. The position identifying watermark embedded in the preceding stage of the blocking circuit 12 is for allowing the position of a unit pixel block in a predetermined section, e.g., a frame, of the video signal to be recognized correctly, and its details will be clarified by a description which will be given later.

The embedding circuit 20 adds the values bearing the copy control watermark to particular ones of the DCT coefficients DC1 to DC64, and outputs values of the result of the addition. As a result, the first and second watermarks are embedded in particular frequency components in the supplied video signal. Since the embedding circuit 20 embeds the first watermark with respect to the video signal in which the second watermark has been embedded, the video signal in which both the first and second watermarks have been embedded is consequently obtained from that output.

The 64 DCT coefficients in which the watermarks are thus embedded are supplied to an inverse DCT circuit 27. The inverse DCT circuit 27 obtains image data blocked for each 8×8 pixels by performing a two-dimensional inverse DCT operation for each 8×8 pixel data block with respect to the supplied 64 DCT coefficients. At this time, the first and second watermarks are embedded in the image data obtained by the inverse DCT circuit 27.

A format converting circuit 29, which has the function of resynthesizing the video signal and to which the image data is supplied from the inverse DCT circuit 27, rearranges the image data of each block to a position corresponding to the horizontal scanning line of the screen (frame), is restored to a digital video signal format, and is outputted.

Such an output video signal is subjected to predetermined coding by an unillustrated MPEG (Moving Picture Experts Group) encoder, and is recorded on the DVD after undergoing various signal processing.

The DVD recorded in the above-described manner is read by an unillustrated DVD player. The DVD player performs demodulation and decoding with respect to the relevant DVD read signal, and effects aspect ratio conversion such as the one described in the prior art (FIGS. 2A to 2C) to obtain the first or second image data of the wide-screen television, pan scan, or letter box type, and outputs the same as an analog video signal.

Such an analog video signal is supplied to a DVD recorder, and serves as a signal subject to recording on a disk such as DVD-RAM or a DVD-R by the DVD recorder.

Figure 4:
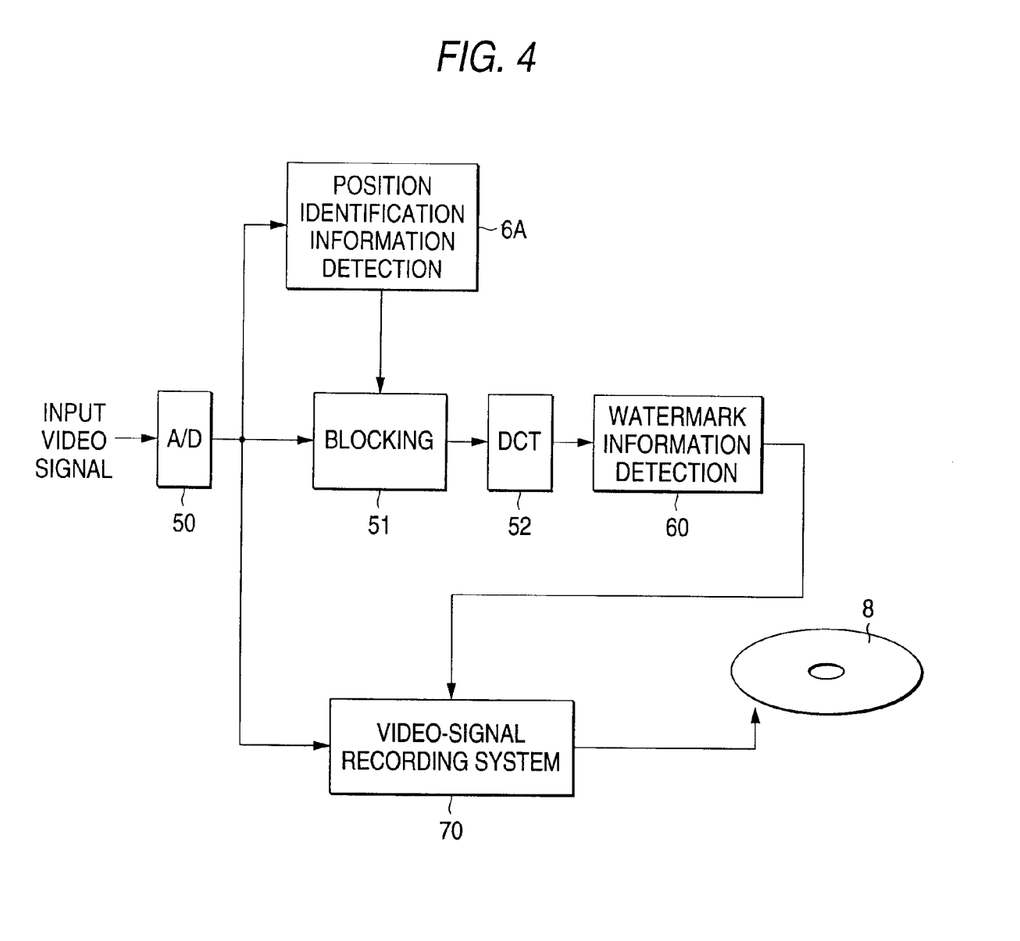
FIG. 4 is a block diagram illustrating a schematic configuration of a DVD recorder in which the watermark detecting apparatus in accordance with an embodiment of the present invention is adopted.

In the DVD recorder, the watermark is detected from the supplied video signal in accordance with the watermark detecting method of the present invention. THE DVD recorder controls the operation of prohibiting the recording operation in accordance with the watermark thus detected. FIG. 4 shows a schematic configuration of such a DVD recorder.

In FIG. 4, an A/D converter 50 generates a digital video signal by digitizing the video signal bearing the first or second image data, and supplies it to a blocking circuit 51 and a position-identifying-information detecting circuit 6A. The blocking circuit 51 divides the inputted digital video signal into pixel blocks each consisting of 8×8 pixel data, and supplies them to a discrete cosine transform (DCT) circuit 52. The position-identifying-information detecting circuit 6A detects the first watermark, i.e., the position identifying watermark, from the inputted digital video signal, and sends in-frame position information in unit blocks based on that watermark to the blocking circuit 51.

In such division into blocks, the blocking circuit 51 confirms the leading position of the unit pixel blocks based on the position identifying watermark. Namely, the blocking circuit 51 effects the division into blocks while properly recognizing the blocks on the basis of the position identifying watermark. The details thereof will be described later.

The DCT circuit 52 performs two-dimensional DCT operations with respect to the pixel blocks in units of 8×8 pixel data determined by the blocking circuit 51 so as to obtain the DCT coefficients DC1 to DC64 corresponding to the 64-system frequency components, and supplies these DCT coefficients DC1 to DC64 to a watermark-information detecting circuit 60. The watermark-information detecting circuit 60 detects the aforementioned copy control watermark for each pixel block in units of the 8×8 pixel data and decrypts it, and supplies a signal corresponding to the contents of information indicated by the relevant watermark to a video-signal recording system 70.

The video signal, which is a digital output from the A/D converter 50, is being supplied to the video-signal recording system 70. Such a video signal is subjected to code conversion processing similar to that of the aforementioned MPEG encoder, and is also subjected to various signal processing for recording on the recordable DVD 8, thereby generating a recording video signal. Recording on the DVD 8 is made correspondingly. In response to the watermark signal supplied from the watermark-information detecting circuit 60, the video-signal recording system 70 prohibits the recording operation if the watermark indicates that copying to the DVD 8 is prohibited. On the other hand, if the watermark indicates that copying is allowed, the video-signal recording system 70 enables the recording operation.

Next, a detailed description will be given of the basic principle of embedding and detecting the position identifying watermark based on the configurations shown in FIGS. 3 and 4.

[A] Basic Principle 1 (Position Identification Using Correlation Function

This basic principle is based on the position identification using a correlation function.

It is now assumed that random noise n which is independent as the position identifying watermark in the auxiliary-watermark-information embedding circuit 10 is added to the image inputted to the auxiliary-watermark-information embedding circuit 10, i.e., an original image f, and that a new image obtained from the output of the inverse DCT circuit 27, for example, is f'. That is, it is assumed that there is a relationship of f'=f+n.

In this case, the cross-correlation function $R_{f',n}$ between f' and n is as follows:

$$R_{f',n}(t) = (1/N)\sum_{k=0}^{N-1} f'_k \cdot n_{k+t} \quad (1)$$

$$= (1/N)\sum_{k=0}^{N-1} (f_k + n_k) \cdot n_{k+t}$$

$$= (1/N)\sum_{k=0}^{N-1} f_k \cdot n_{k+t} + (1/N)\sum_{k=0}^{N-1} n_k n_{k+t}$$

$$= R_{f,n}(t) + R_n(t)$$

Thus, because f'=f+n, it can be understood that $R_{f',n}(t)$ is the sum of the cross-correlation function $R_{f,n}(t)$ between the original image f and the random noise n and the auto-correlation function $R_n(t)$ of the random noise n, and that $R_{f',n}(t) = R_{f,n}(t) + R_n(t)$ is derived.

Here, since the original image f and the random noise n are mutually independent, $$R_{f,n}(t) = 0 \quad (2)$$

Therefore, $$R_{f',n}(t) = R_n(t) \quad (3)$$

Accordingly, it can be understood that if the auto-correlation function $R_n$ of the noise is known, it is possible to identify the position by providing its matching in the position-identifying-information detecting circuit 6A.

Figure 5:
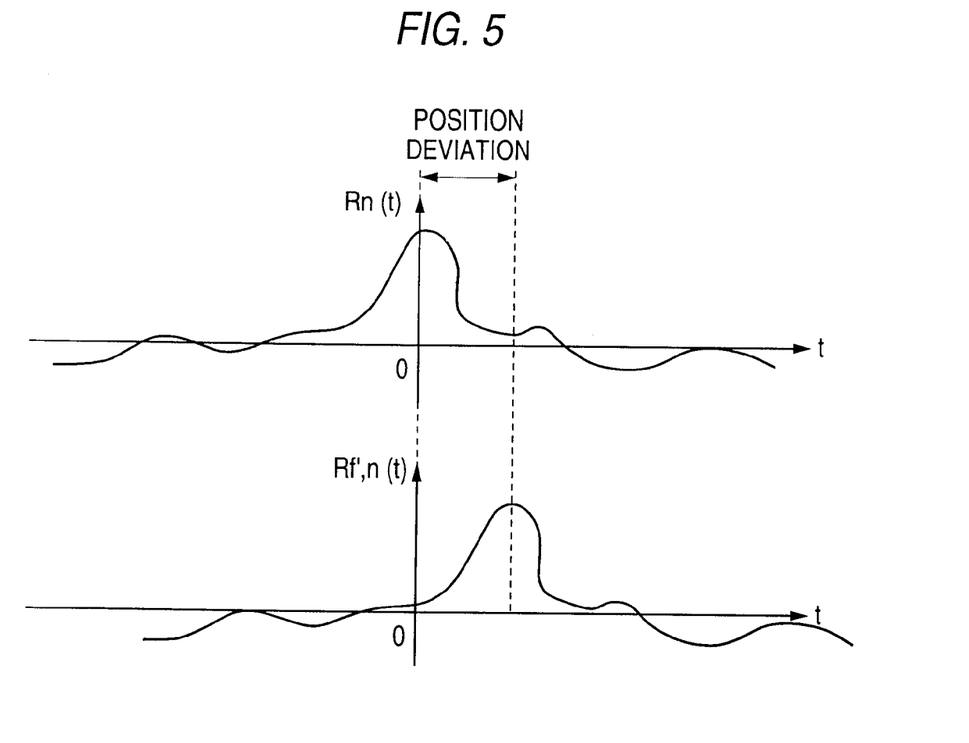
FIG. 5 is a time chart illustrating by way of example the relationship among an image f' in which the watermark information is embedded, a cross-correlation function $R_{f',n}(t)$ of random noise n, and an auto-correlation function $R_n(t)$ of the random noise n.

Incidentally, an illustration of the relationship between $R_n(t)$ and $R_{f',n}(t)$ is shown in FIG. 5.

[B] Basic Principle 2 (Use of M-sequence)

More specifically, the M-sequence can be applied to the aforementioned random noise, and the recurrence of the M-sequence with a period N can be used as a random pattern of the noise.

The M-sequence referred to herein is one of pseudorandom signals which is the so-called maximum length sequence. As for the M-sequence, a detailed description is given in a publication entitled "M-sequence and its applications" (author: Hiroshi Kashiwagi; published by Shoukoudou Co. Ltd. on Mar. 25, 1996).

The auto-correlation function Rm(t) of a sequence $m_k$ in which "0" and "1" in an M-sequence $a_k$ with a period N are made to correspond to −1 and +1, respectively, has the characteristic that the following formula holds:

$$Rm(t) = (1/N)\sum_{i=0}^{N-1} m_i m_{i+t} \quad (4)$$

$$= 1 \quad (t = kN \text{ where } k \text{ is an integer) or}$$

$$= -1/N \quad (t \neq kN \text{ where } k \text{ is an integer)}$$

The M-sequence has a sharp auto-correlation which is advantageous in the identification of the position. As can be appreciated from the above Formulae, the M-sequence exhibits a sharp peak only when the position has matched, and assumes a value which is substantially close to zero at other locations. By detecting this peak, it is possible to effect the identification of the position.

To improve such a detecting capability, the M-sequence $a_k$ which is used should preferably have as long a period N as possible, and it is preferable to select an M-sequence $a_k$ which has good independence with respect to the original image.

Figure 6:
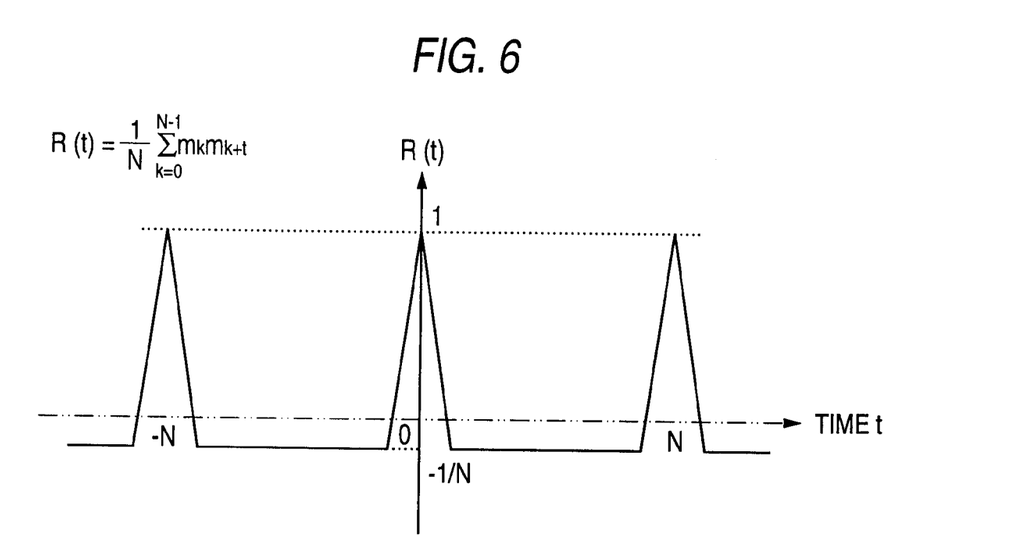
FIG. 6 is a characteristic diagram of an auto-correlation function Rm(t) of a sequence $m_k$ in which "0" and "1" in an M-sequence $a_k$ with a period N are made to correspond to −1 and +1, respectively.

Incidentally, FIG. 6 shows a characteristic diagram of Rm(t).

[C] Embedding Method

Next, a description will be given of an actual method of embedding the position identifying watermark.

First, the position identifying watermark is fixed between frames, and is set as a random pattern $m_{x,y}$ extended two-dimensionally on the basis of the M-sequence. In addition, as the period N of the M-sequence $a_k$ used, a value greater than the number of pixels of one frame is selected. Further, the generation of the M-sequence $a_k$ which forms the basis in the random pattern generation is effected by a shift register which makes use of primitive polynomials. In other words, it is unnecessary for the random pattern generator to be provided in the form of a ROM. Further, an initial value of the shift register at this time is fixed, so that the random pattern which is generated is made identical between the frames.

The random pattern $m_{x,y}$ used is changed as shown in the formula below through the value of the X-sequence $a_k$ generated. In this formula, H and V denote the numbers of pixels in the horizontal direction and the vertical direction in the image (frame image), and B denotes a parameter of strength.

$$m_{x,y} = B(a_{Hy+x}=1)$$

or $$= (-B+1) \text{ or } (-B)(a_{Hy+x}=0) \quad (5)$$

The random pattern $m_{x,y}$ thus generated is added to the overall original image.

At this juncture, an optimum strength B is selected by taking the detecting capability and image quality into consideration. Namely, since the strength B exerts a large influence on the image quality and the detecting capability, it suffices if an optimum value is determined after attempting the embedding with a number of values.

[D] Detecting Method

Meanwhile, an actual method of detecting the position identifying watermark is as follows.

The M-sequence $a_k$ used herein is used as being known, and a sequence $I_{i,j(x,j)}$ of the following formula is obtained.

$$I_{(i,j)x,y} = 1(a_{H(y+j)+(x+i)}=1)$$

or $$= -1(a_{H(y+j)+(x+i)}=0) \quad (6)$$

where it is assumed that, as for the size of the original image, the number of pixels in the horizontal direction is H, and the number of pixels in the vertical direction is V.

Then, the cross-correlation between this sequence $I_{i,j(x,j)}$ and the original image $f_{x,y}$ is calculated.

The range of deviation between the original image and the input image (the image with the watermark supplied to the blocking circuit 51 and the position-identifying-information detecting circuit 6A) is already known in many cases. Accordingly, (i, j) is changed within such a range, and the aforementioned calculation, i.e., the calculation of the cross-correlation between this sequence $I_{i,j(x,j)}$ and the original image $f_{x,y}$, is repeated.

The combination of (i, j) at he time when the peak value of the cross-correlation is assumed in the result of such calculation indicates the position which corresponds to the upper left pixel in the original image frame (the leading-end pixel of the leading unit pixel block) in the input image frame.

By adopting such a procedure, it becomes possible to identify the final position of the block in the image data after the aspect ratio conversion. Subsequently, if detection of the copy control watermark is effected for each block on the basis of the position information thus obtained, proper detection can be effected.

Figure 7:
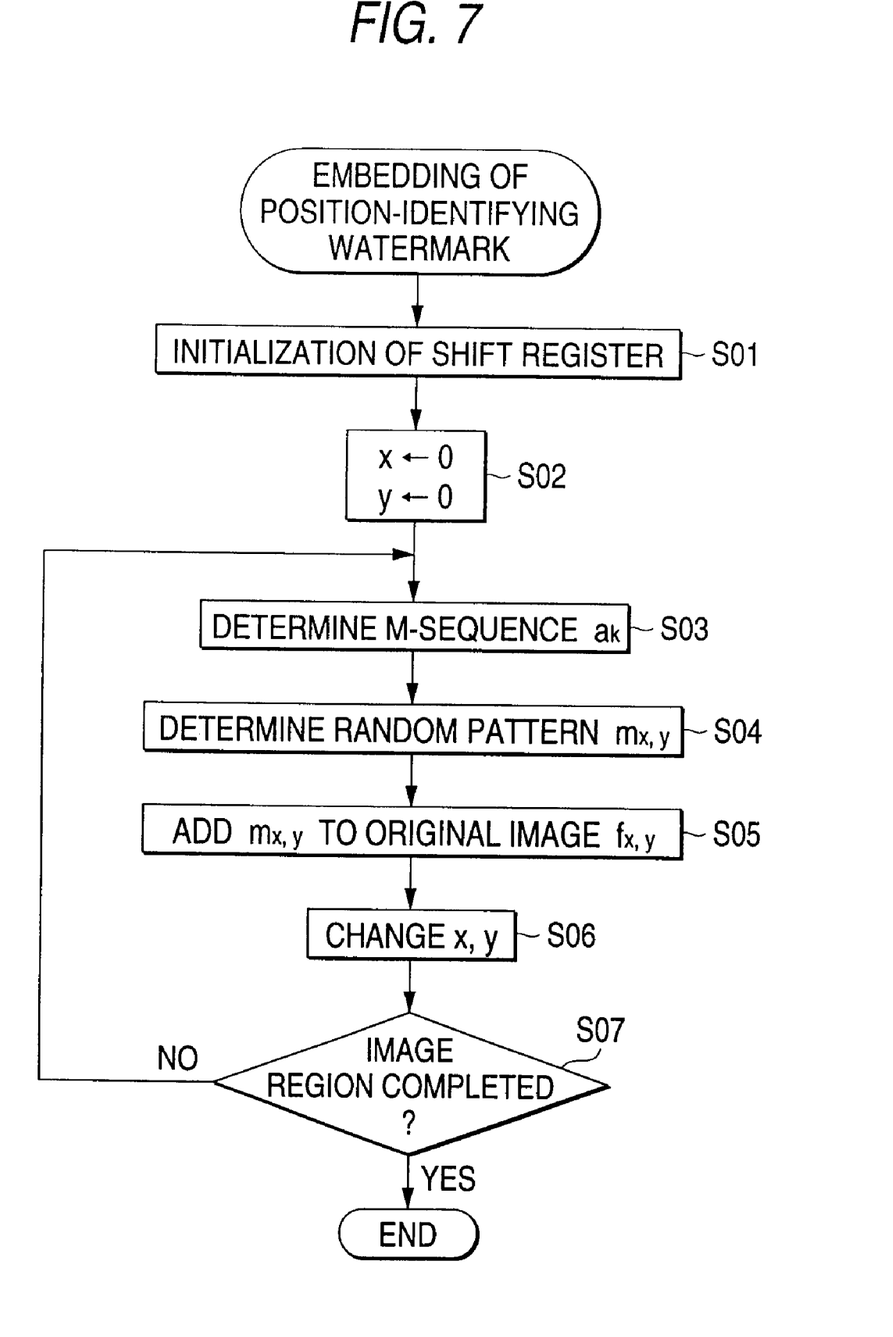
FIG. 7 is a flowchart illustrating a position-identifying-watermark embedding operation effected by the apparatus shown in FIG. 3.

FIG. 7 shows the principal characteristic operation of the auxiliary-watermark-information embedding circuit 10 shown in FIG. 3.

In FIG. 7, the embedding circuit 10 initializes the aforementioned shift register (Step S01), and stores 0 in x and y, respectively (Step S02).

Then, the embedding circuit 10 determines the aforementioned M-sequence $a_k$ (Step S03), and determines the aforementioned random pattern $m_{x,y}$ (Step S04). Further, the embedding circuit 10 accomplishes the embedding of the position identifying watermark by adding $m_{x,y}$ to the original image $f_{x,y}$ (Step S05). Then, the embedding circuit 10 changes the values of x, y (Step S06), and repeats the processing in Steps S03 to S07 until the setting of x, y for a predetermined image region and the embedding of the watermark based thereon is completed (Step S07). If the processing for the predetermined image region is completed, the embedding circuit 10 executes the embedding processing of the position identifying watermark with respect to an ensuing frame image.

Figure 8:
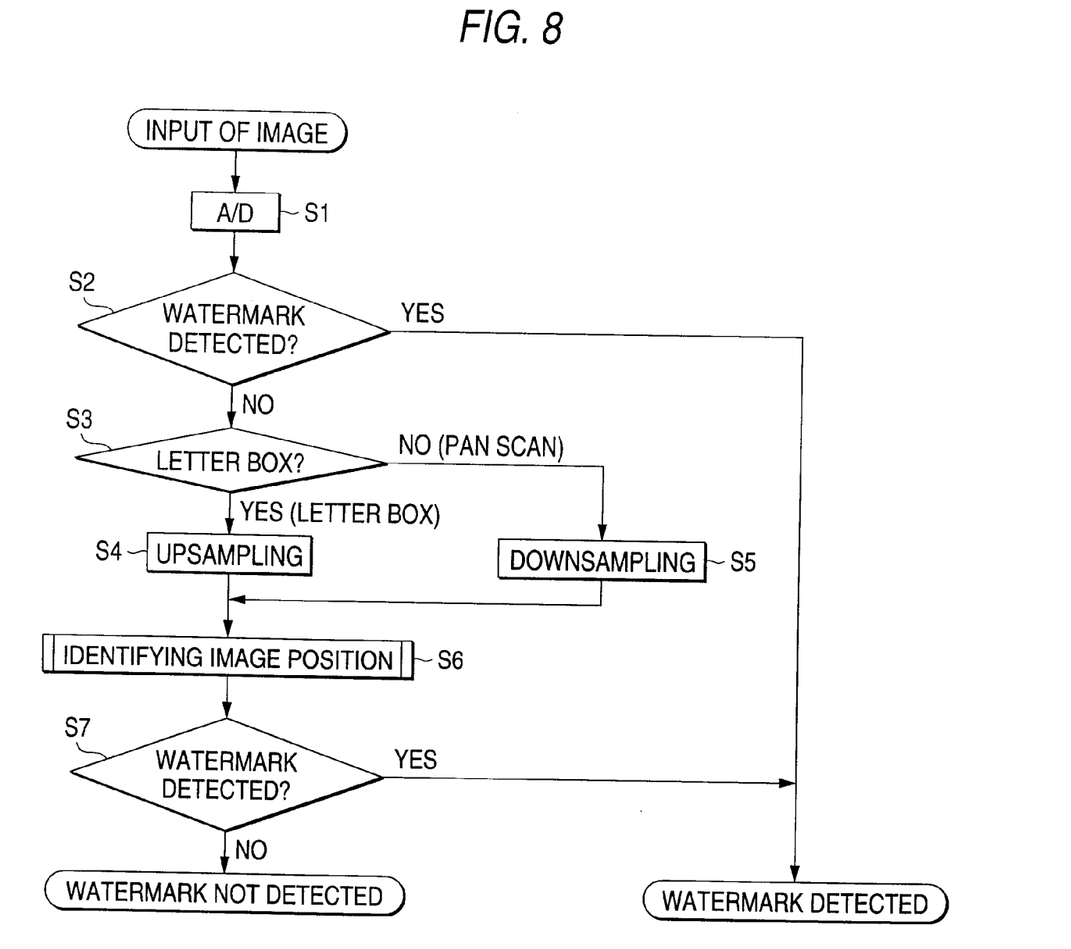
FIG. 8 is a flowchart illustrating the characteristic operation effected by the blocking circuit and the watermark-information detecting circuit shown in FIG. 4.

FIG. 8 is a flowchart illustrating the principal characteristic operation of the blocking circuit 51, the position-identifying-information detecting circuit 6A, and the watermark-information detecting circuit 60 which are shown in FIG. 4.

In FIG. 8, if a digitized video signal is inputted from the A/D converter 50 (Step S1), the blocking circuit 51 determines whether or not the copy control watermark has been detected (Step S2). In this determination, a flag signal (watermark detection flag) is used which indicates whether or not it has been possible to detect the copy control watermark and which is issued from the watermark-information detecting circuit 60.

If the video signal from the A/D converter 50 bears the aforementioned first image data, the matching characteristic of the unit pixel block in the frame image, which is formed by the video signal, with respect to the original image is not destroyed in many cases. Hence, the division into blocks which is effected by the blocking circuit 51 is effected on the basis of predetermined position coordinates, with the result that the watermark-information detecting circuit 60 is capable of properly detecting and encrypting the copy control watermark with respect to the divided unit pixel blocks (the watermark is successfully detected).

On the other hand, if the video signal from the A/D converter 50 bears the aforementioned second image data, the matching characteristic of the unit-pixel block in the frame image, which is formed by the video signal as described earlier with reference to FIGS. 2A and 2C, with respect to the original image is destroyed. To cope with this situation, the position-identifying-information detecting circuit 6A determines whether or not the relevant video signal is of the letter body type (Step S3). The video signal which is not determined to be of the letter box type can be determined to be of the pan scan type.

If the video signal is of the letter box type, the blocking circuit 51 upsamples the video signal and effects aspect conversion in the direction opposite to the converting direction shown in FIG. 2C so as to return the image to the original image (Step S4). On the other hand, if the video signal is of the pan scan type, the blocking circuit 51 downsamples the video signal and effects aspect conversion in the direction opposite to the converting direction shown in FIG. 2B so as to return the image to the original image (Step S5).

After the image is thus returned to the original image, the position-identifying-information detecting circuit 6A effects the identification of the image position by using the position identifying watermark embedded in the video signal, more specifically the proper positioning of the unit pixel blocks to be divided with respect to the video signal (Step S6). The details of the image position identification processing in this step will be described later.

After the identification of the image position, the blocking circuit 51 effects the division of the video signal into blocks on the basis of the position of the unit pixel blocks thus determined, and the watermark-information detecting circuit 60 detects and encrypts the copy control watermark with respect to the divided unit pixel blocks (Step S7). If proper block division has been effected, the aforementioned watermark detection flag outputted from the watermark-information detecting circuit 60 is set in a set state (the watermark is successfully detected), and the video-signal recording system 70 prohibits/allows the recording operation with respect to the DVD 8 in accordance with the contents of the copy control watermark detected. If, to the contrary, on the grounds that proper block division has not been effected, the watermark detection flag outputted from the watermark-information detecting circuit 60 is not set in the set state (the watermark is not detected), the video-signal recording system 70 effects processing corresponding to it, e.g., prohibits the recording operation with respect to the DVD 8.

If the watermark is not detected, similar processing is effected with respect to a predetermined number of other frames as well. If, here again, the watermark cannot be detected from the predetermined number of frames, a final determination is made that the watermark detection is unsuccessful.

Figure 9:
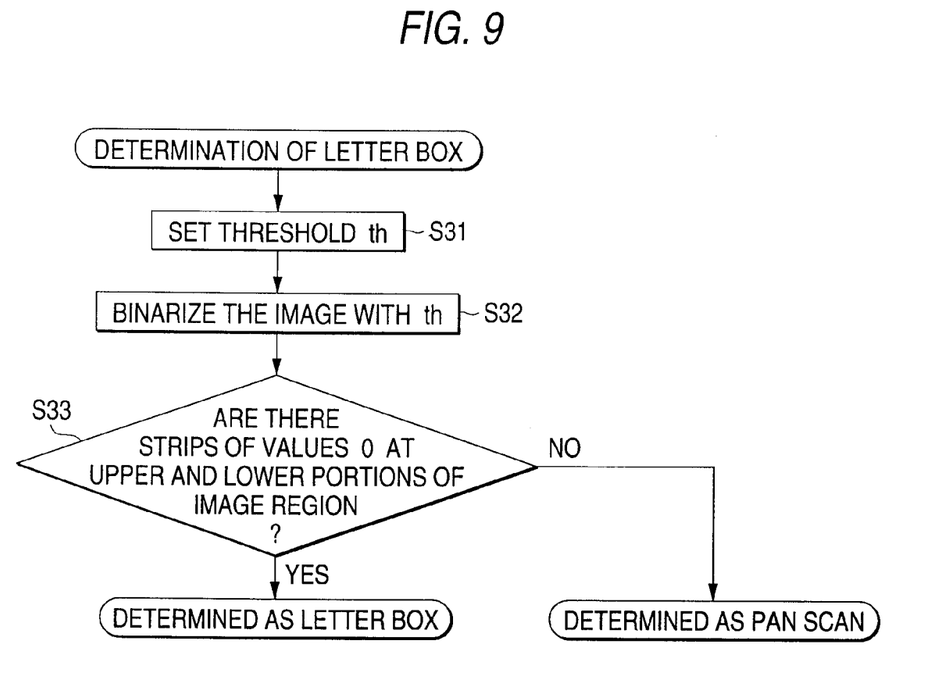
FIG. 9 is a flowchart illustrating the procedure of letter-box determination processing in Step S3 shown in FIG. 8.

The procedure of the processing in Step S3 is shown in FIG. 9.

In FIG. 9, the position-identifying-information detecting circuit 6A first sets the value of a threshold th (Step S31). Then, the position-identifying-information detecting circuit 6A binarizes the input vide signal on the basis of the value of this threshold th (Step S32).

With respect to the binarized data, a determination is made by the position-identifying-information detecting circuit 6A as to whether or not strip-like images with values 0 are present in predetermined image regions, i.e., in upper and lower portions of the frame image (Step S33). Such strip-like images are peculiar to the letter box image shown in FIG. 2C, and correspond to the images provided at the upper and lower portions of the original image.

Accordingly, if these strip-like images are present, it can be determined that the relevant video signal bears the letter box image, and if not, it can be determined that the video signal bears the pan scan image.

Figure 10:
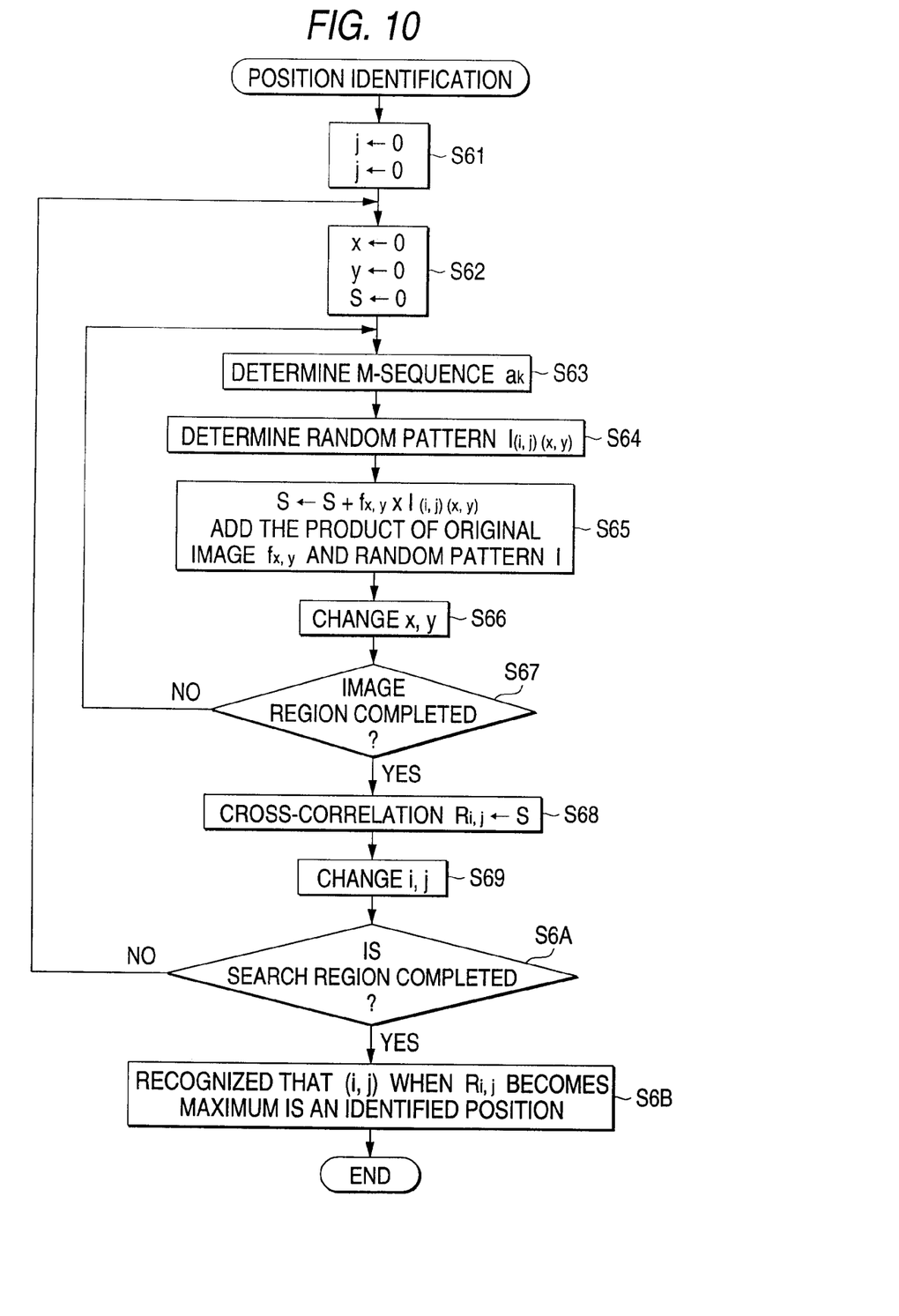
FIG. 10 is a flowchart illustrating the procedure of position identification processing in Step S6 shown in FIG. 8.

The procedure of the processing in Step S6 shown in FIG. 8 is shown in FIG. 10.

In FIG. 10, the position-identifying-information detecting circuit 6A first stores 0s in i, j, respectively, so as to initialize i, j (Step S61), and stores 0s in s, y, and S as well (Step S62).

Next, the position-identifying-information detecting circuit 6A determines the M-sequence $a_k$ (Step S63), and determines the random pattern. $I_{(i,j)x,y}$ in accordance with the aforementioned formula (6) (Step S64). The position-identifying-information detecting circuit 6A calculates the product of the thus-determined sequence $I_{(i,j)x,y}$ and the original image $f_{x,y}$, and adds the result of the calculation to S (Step S65). Then, the position-identifying-information detecting circuit 6A changes x, y (Step S66), and repeats the processing in Steps S63 to S66 until the calculation with respect to the predetermined image region is completed (Step 67).

If the summing calculation with respect to the predetermined image region is completed, the correlation coefficient becomes definite. The position-identifying-information detecting circuit 6A replaces the value of S as the definite cross-correlation $R_{i,j}$ (Step S68). Then, the blocking circuit 51 changes i, j (Step S69), and repeats the processing in Steps S62 to S69 until the setting of i, j with respect to the predetermined search region and the calculation based thereon are completed (Step S6A).

Upon completion of the calculation processing of i, j with respect to the predetermined search region, the position-identifying-information detecting circuit 6A detects a maximum value among the values of the cross-correlations $R_{i,j}$ stored in Step S68, and recognizes that (i, j) corresponding to that detected maximum value designates the identified position (Step S6B). After the recognition, the processing of this flowchart ends.

Thus, when the data of the pan scan image is inputted, the position-identifying-information detecting circuit 6A is capable of recognizing that the third unit pixel block from the left in the 4:3 image, such as the one shown in FIG. 2B, is fragmentary, and of correctly starting the detection of the copy control watermark beginning with the ensuing unit pixel block which is not fragmentary. As a result, it is possible to effect the correct detection of the watermark with respect to the unit pixel blocks following the third unit pixel block, so that the drawback which is conventionally encountered does not occur.

In addition, in a case where the data of the letter box image is inputted, the position-identifying-information detecting circuit 6A is capable of recognizing that the relevant leading unit pixel block in the 4:3 image, such as the one shown in FIG. 2C, has shifted from the leftmost position to the moved position in the image (frame image), and is capable of correctly starting the detection of the copy control watermark beginning with the moved position. As a result, it is possible to effect the correct detection of the watermark with respect to the unit pixel blocks following the moved position, so that the drawback which is conventionally encountered does not occur.

Although, in the above-described embodiment, a description has been given of the identification of the position which is effected in the DVD recorder, the present invention is not necessarily limited to this form. For instance, it is possible to effect the identification of the position with respect to an information data signal which is transmitted and received in, for example, Internet and other communications or transmission forms in which various media are handled.

In addition, although, in the above-described embodiment, as the main first watermark a description has been given of the copy control watermark which bears information as to whether or not copying is allowed, the present invention is not necessarily limited to the same. For instance, ID information on a person to whom the use of a relevant copyrighted item is allowed may be set as the first watermark information, and various other information may also be applied.

Furthermore, although, in the above-described embodiment, a description has been given of the embedding of the watermark using the DCT and the inverse DCT, the block division method is also applicable to the method in which the watermark information is embedded in sampled values as described above, and the present invention is effective in such block division as well. In brief, the present invention is widely applicable to forms in which information data to be watermarked is divided into blocks and the main watermark is embedded.

In addition, although, in the above-described embodiment, a description has been given of the embedding and detection of watermark information with respect to image data, it goes without saying that the present invention is applicable to sound data and the like.

In addition, although, in the above-described embodiment, the 8×8 pixel data is cited as the divided unit block of the image data signal, it goes without saying that unit blocks other than the same may be formed.

Although, in the above-described embodiment, various means are described in a limiting manner, the above-described means may be modified, as required, within a range designable by those skilled in the art.

As described above, in accordance with the present invention, it is possible to provide a method and apparatus for superposing a digital watermark on image data and a method and apparatus for detecting a digital watermark which make it possible to properly recognize a unit pixel block in the block division method and reliably detect watermark information.

Furthermore, after image data is subjected to aspect ratio conversion, it is possible to properly recognize a unit pixel block and reliably detect watermark information.

What is claimed is:

1. A method for superposing a digital watermark for superposing digital watermark information on an information data signal bearing original information, the method comprising:

embedding position information in the information data signal to produce a changed information data signal; and embedding the digital watermark information in the changed information data signal, wherein the position information bears information for recognizing a position of the digital watermark information.

2. The method for superposing a digital watermark according to claim 1, wherein the information data signal is a video signal.

3. The method for superposing a digital watermark according to claim 2, wherein the position information is information of a random pattern.

4. The method for superposing a digital watermark according to claim 1, wherein the position information is information of a random pattern.

5. An apparatus for superposing a digital watermark for superposing digital watermark information on an information data signal bearing original information, the apparatus comprising:

an auxiliary embedding circuit that embeds position information in the information data signal to produce a changed information data signal; and a main embedding circuit that embeds the digital watermark information in the changed information data signal, wherein the position information bears information for recognizing a position of the digital watermark information.

6. The apparatus for superposing a digital watermark according to claim 5, wherein the information data signal is a video signal.

7. The apparatus for superposing a digital watermark according to claim 6, wherein the position information is information of a random pattern.

8. The apparatus for superposing a digital watermark according to claim 5, wherein the position information is information of a random pattern.

9. A method for detecting a digital watermark for detecting digital watermark information from a changed information data signal generated by superposing the digital watermark information on an information data signal, the method comprising:

detecting position information from the changed information data signal; and detecting the digital watermark information from the changed information data signal based on the detected position information.

10. The method for detecting a digital watermark according to claim 9, wherein the information data signal is a video signal.

11. The method for detecting a digital watermark according to claim 10, wherein the position information is information of a random pattern.

12. The method for detecting a digital watermark according to claim 9, wherein the position information is information of a random pattern.

13. An apparatus for detecting a digital watermark for detecting digital watermark information from a changed information data signal generated by superposing the digital water mark information on an information data signal, the apparatus comprising:

a position information detector that detects position information from the changed information data signal; and a watermark information detector that detects the digital watermark information from the changed information data signal based on the detected position information.

14. The apparatus for detecting a digital watermark according to claim 13, wherein the information data signal is a video signal.

15. The apparatus for detecting a digital watermark according to claim 14, wherein the position information is information of a random pattern.

16. The apparatus for detecting a digital watermark according to claim 13, wherein the position information is information of a random pattern.

17. A method comprising:

embedding position information in an information data signal to produce a changed information data signal;

embedding a digital watermark information in the changed information data signal;

detecting the position information from the changed information data signal; and detecting the digital watermark information from the changed information data digital based on the detected position information, wherein the position information bears information for recognizing a position of the digital watermark information embedded.

18. The method according to claim 17, wherein the information data signal is a video signal.

19. The method according to claim 18, wherein the position information is information of a random pattern.

20. The method according to claim 17, wherein the position information is information of a random pattern.

21. A system comprising:

an auxiliary embedding circuit that embeds position information in an information data signal to produce a changed information data signal;

a main embedding circuit that embeds a digital watermark information in the changed information data signal;

a position information detector that detects the position information from the changed information data signal; and a watermark information detector that detects the digital watermark information from the changed information data signal based on the detected position information, wherein the position information bears information for recognizing a position of the digital watermark information.

22. The system according to claim 21, wherein the information data signal is a video signal.

23. The system according to claim 22, wherein the position information is information of a random pattern.

24. The system according to claim 21, wherein the position information is information of a random pattern.

* * * * *